US008556179B2

(12) United States Patent
Gillet et al.

(10) Patent No.: US 8,556,179 B2
(45) Date of Patent: Oct. 15, 2013

(54) MOTION TOLERANT BAR CODE READER

(75) Inventors: Alain Gillet, Labege Cedex (FR); Serge Thuries, Saint Jean (FR)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 13/210,575

(22) Filed: Aug. 16, 2011

(65) Prior Publication Data

US 2013/0043314 A1 Feb. 21, 2013

(51) Int. Cl.
G02B 26/10 (2006.01)
G06K 7/10 (2006.01)
G06K 9/22 (2006.01)
G06K 19/06 (2006.01)
G06K 7/14 (2006.01)
G06K 7/00 (2006.01)
G08C 21/00 (2006.01)

(52) U.S. Cl.
USPC ............... 235/462.25; 235/462.01; 235/454; 235/462.06; 235/462.42; 235/455; 235/435

(58) Field of Classification Search
USPC .......... 235/462.01, 454, 462.06, 462.42, 455, 235/435, 462.25
See application file for complete search history.

(56) References Cited

U.S. PATENT DOCUMENTS

| 4,929,066 | A | * | 5/1990 | Wakimoto et al. | 359/663 |
|---|---|---|---|---|---|
| 5,347,121 | A | * | 9/1994 | Rudeen | 250/235 |
| 5,350,909 | A | * | 9/1994 | Powell et al. | 235/462.32 |
| 5,468,950 | A | * | 11/1995 | Hanson | 235/454 |
| 5,992,751 | A | * | 11/1999 | Laser | 235/472.01 |
| 7,063,261 | B2 | * | 6/2006 | Vinogradov et al. | 235/454 |
| 7,142,334 | B1 | * | 11/2006 | Zechleitner | 358/474 |
| 7,478,754 | B2 | * | 1/2009 | Gurevich et al. | 235/462.24 |
| 8,118,226 | B2 | * | 2/2012 | Olmstead et al. | 235/455 |
| 8,346,346 | B1 | * | 1/2013 | Schnitzer et al. | 600/476 |
| 2005/0231817 | A1 | * | 10/2005 | Matsusaka et al. | 359/680 |
| 2005/0259333 | A1 | * | 11/2005 | Matsusaka | 359/680 |
| 2006/0060653 | A1 | * | 3/2006 | Wittenberg et al. | 235/462.01 |
| 2006/0083504 | A1 | * | 4/2006 | Matsusaka | 396/72 |
| 2006/0087747 | A1 | * | 4/2006 | Ohzawa et al. | 359/749 |
| 2006/0164736 | A1 | * | 7/2006 | Olmstead et al. | 359/793 |
| 2006/0180670 | A1 | * | 8/2006 | Acosta et al. | 235/462.31 |
| 2007/0084927 | A1 | * | 4/2007 | Itou et al. | 235/454 |
| 2008/0212168 | A1 | * | 9/2008 | Olmstead et al. | 359/355 |
| 2009/0084847 | A1 | * | 4/2009 | He et al. | 235/455 |

OTHER PUBLICATIONS

Pantazis Mouroulis, Depth of Field Extension with Spherical Optics, Jet Propulsion Laboratory, California Institute of Technology, Pasadena, CA 91109, USA, Corresponding author: pantazis.mouroulis@jpl.nasa.gov, Aug. 18, 2008, vol. 16, No. 17/OPTICS EXPRESS 12995, 2008 Optical Society of America, 10 pages.

(Continued)

*Primary Examiner* — Daniel Walsh
(74) *Attorney, Agent, or Firm* — Shook, Hardy & Bacon L.L.P.

(57) ABSTRACT

A 2D bar code reader with improved motion tolerance is presented. The 2D bar code reader includes a lens configuration that enhances chromatic aberration to separate the focal planes on which bar code images from two different color components of a light will be focused. An imager interprets one of the focal planes as the image and the other one as noise to be ignored. In addition, the increased depth of field generated by the chromatic aberration allows for a larger aperture stop setting and quicker shutter speed, thereby improving motion tolerance.

7 Claims, 4 Drawing Sheets

(56) References Cited

OTHER PUBLICATIONS

Benjamin Milgrom, Naim Konforti, Michael A. Golub, and Emanuel Marom, Faculty of Engineering, Tel Aviv University, 69978 Tel Aviv, Isreal, milgrom@gmail.com, Novel Approach for Extending the Depth of Field of Barcode Decoders by Using RGB Channels of Information, Aug. 2, 2010, vol. 18, No. 16/OPTICS EXPRESS 17027, 2010 OSA, 13 pages.

* cited by examiner

MOTION TOLERANT BAR CODE READER

BACKGROUND

One-dimensional (1D) bar codes are machine-readable objects used to store information about a product, package, or other item upon which the 1D bar code is affixed. 1D bar codes store information only in the horizontal direction, and laser scanners are often used to read and decode these bar codes. Such laser, or "point," scanners exhibit a high motion tolerance making them ideal for accurately decoding 1D bar codes.

But 1D bar codes are limited in application due to the small amount of information they contain. 1D bar codes store information only in one dimension, merely encoding a number or other identifier that, after decoding, must be compared to an external database containing relevant information. For example, after decoding 1D bar code encoding a product identifier, a computer may retrieve the price, quantity, or other relevant information about the product from an external database.

Due to the limited application of 1D bar codes, two-dimensional (2D) bar codes have recently grown in popularity. Unlike 1D bar codes, 2D bar codes contain information in both the horizontal and vertical directions, storing more information than 1D bar codes. This requires sophisticated 2D imagers to decode the entire image at once. Such imagers have a low motion tolerance, as any movement of the bar code or imager during image capture causes the image as a whole to blur, resulting in sluggish read rates.

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, ways to provide an improved 2D imager that achieves increased motion tolerance over present 2D imagers. Specifically, one embodiment of the invention uses chromatic aberration generated by a specially chosen lens configuration to increase the depth of field (DOF) of an optical system used in a 2D imager. Chromatic aberration is a lens distortion caused by dispersion caused by light passing through a lens. The chromatic aberration causes different wavelengths of light to be focused at different distances. By using a lens configuration with chromatic aberration, a greater DOF is achieved. The improved 2D imager may "give up" its improved DOF and instead incorporate an optical system with a larger aperture to achieve the same DOF as standard 2D imagers, allowing the improved 2D imager to use a quick shutter speed to capture an image.

BRIEF DESCRIPTION OF THE DRAWINGS

Illustrative embodiments of the invention are described in detail below with reference to the attached drawing figures, and wherein.

DETAILED DESCRIPTION

Embodiments of the invention use a lens configuration that causes chromatic aberration of an image to provide improved motion tolerance. The improved 2D imager can capture bar code images using a faster shutter speed than standard 2D imagers, reducing the time needed to capture an image of a bar code and ultimately increasing motion tolerance.

Bar codes encode information in a machine-readable format. For example, a bar code may comprise a series of low reflective bars (e.g., black) that are separated from a series of highly reflective spaces (e.g., white). The bars and spaces are arranged in unique groups in order to encode data. These simple bar codes provide data in one dimension (horizontal) and are accordingly often referred to as "linear" bar codes or "1D" bar codes. A scanner passing over a 1D bar code shines a light on the bars and spaces. When the light source passes over the lowly reflective bars, the light is mostly absorbed. And when the light source passes over the highly reflective spaces, the light is mostly reflected back to the scanner. The scanner, using decoding circuitry, decodes the reflected light, interpreting the alternating bars and spaces as a number or other identifier.

Recently 2D bar codes have grown in popularity due to the increased information they convey. Unlike their 1D counterparts, 2D bar codes store information in both the vertical and horizontal directions, dramatically increasing the amount of data contained within the bar code itself. Information that was once stored in a database and externally referenced is now directly contained within the 2D bar code.

Figure 1:
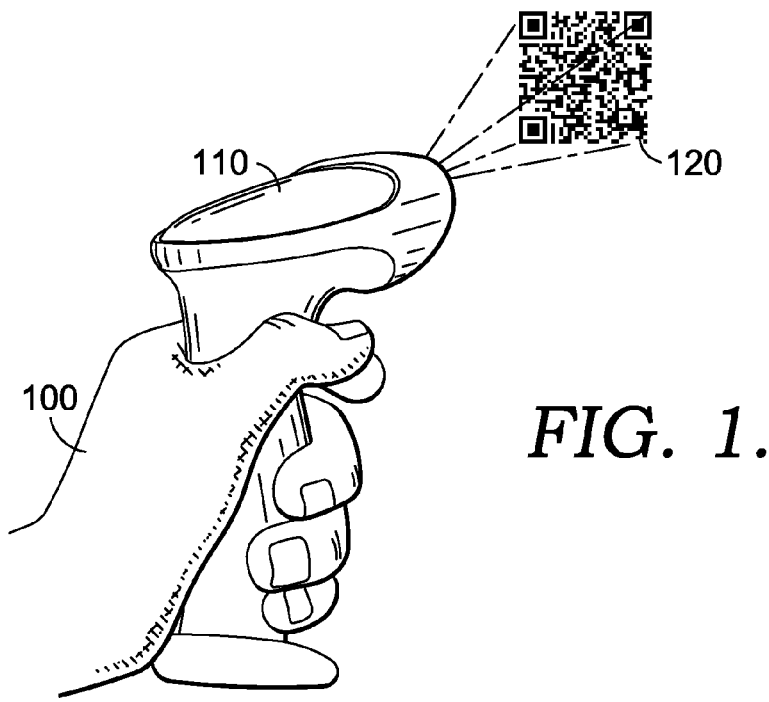
FIG. 1 depicts a handheld 2D imager scanning a 2D bar code.

Sophisticated imagers are needed to capture 2D bar codes and decode the image as a whole. FIG. 1 depicts one example of a handheld 2D imager 110 scanning a 2D bar code 120. In FIG. 1, an operator 100 holds the 2D imager 110 and aims it at a 2D bar code 120. When the operator activates the 2D imager 110, a light source contained within the imager illuminates the entire 2D bar code 120 at once. The lowly reflective portions of the 2D bar code 120 (the dark spaces) absorb most of the light source and the highly reflective portions (the white spaces) reflect most of the light source back toward the 2D imager 110. Unlike traditional 1D scanners that use a flying spot to travel horizontally across a 1D bar code, the 2D imager 110 captures the entire image at once to decode the image as a whole. Embodiments of the present invention may take the form of a handheld 2D imager or a fixed imager (not shown). A fixed imager may read bar codes that are moving or stationary. For example, a fixed imager that is attached to a conveyor system may read bar codes affixed to passing objects.

Figure 2:
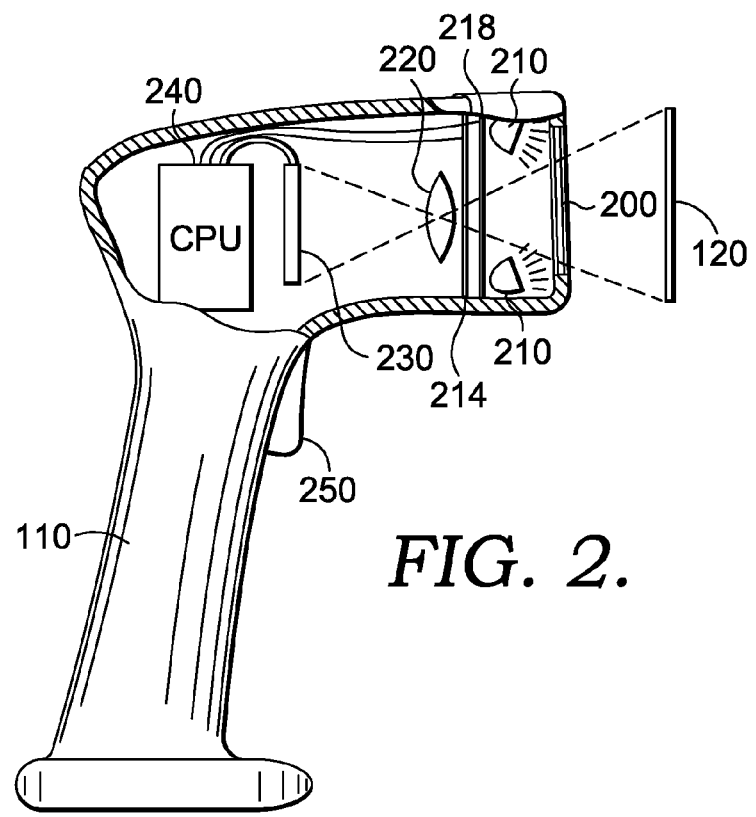
FIG. 2 is a cutaway of a 2D imager according to an embodiment of the invention.

FIG. 2 presents a cutaway of the 2D imager 110, revealing the major components required to capture and decode the 2D bar code 120 according to embodiments of the present invention. Similar components are present in a fixed embodiment. Specifically, the 2D imager 110 contains a viewing window 200, a light source 210, a shutter 214, an aperture 218, a lens module 220, an image sensor 230, a processor 240 (depicted as a central processing unit or CPU), and an on/off operator interface 250 (depicted as a trigger). The components in FIG. 2 are merely representative of the appearance of actual components used to build the 2D imager. The actual appearance of components and the imager 110 could vary. Further, the components may be rearranged in some cases.

The 2D imager 110 may include a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage, or other magnetic storage devices. The computer-storage media may be nontransitory.

An operator activates the 2D imager 110 by toggling the on/off operator interface 250. In a fixed setting, a 2D imager may be activated by a proximity sensor or other mechanism. The 2D imager 110 captures an image of the 2D bar code 120 by using the light source 210 to illuminate the 2D bar code 120. The white spaces of the 2D bar code reflect most of the light back toward the 2D imager, and the black spaces absorb most of the light. The reflected light travels through the viewing window 200, the shutter 214, the aperture 218, and then passes through a lens module 220 where it is refracted, and ultimately forms a negative image of the 2D bar code 120 on the image sensor 230. Though lens module 220 is depicted as a single lens, embodiments of the present invention may use a series of lenses that are configured to generate a chromatic aberration through the lens module 220. The processor 240 then decodes the image, interpreting the information that the 2D bar code 120 conveys. Although depicted inside 2D imager 110 in FIG. 2, components, including the light source 210 and processor 240, may be located externally. In some embodiments, the light source is ambient light.

Because the entire image of the 2D bar code 120 is formed on the image sensor 230 at once, any movement of the 2D imager 110 or the 2D bar code 120 during image capture creates a blurry image. Unlike flying point scanners used for 1D bar code decoding—where movement only causes skewing in a small portion of the image—movement of the 2D imager 110 or 2D bar code 120 creates simultaneous skewing at all portions of the image, resulting in failure to decode the image. And unlike 1D bar codes where the information contained in one dimension is relatively small allowing for rapid image capture, 2D bar codes require more time to effectively capture the image. 2D imagers are thus subject to sluggish read rates as images must be repeatedly captured until there is little movement and a crisp image is formed on the image sensor.

The shutter 214 comprises a movable mechanical barrier that opens and closes to allow light into the 2D imager 110. The mechanical barrier may be a leaf, diaphragm, or other mechanism. The shutter 214 also comprises a timer that controls the amount of time the shutter is in the open position. The timer may by coupled to the processor or other controller for the 2D imager. This allows the processor to specify the shutter speed. Shutter speed refers to how long an optical system remains open during image capture. If a slow shutter speed is used, the optical system remains open for a long time, and the image is susceptible to blurring upon movement of the 2D imager or the 2D bar code. If a quick shutter speed is used, the optical system remains open for a short time, and thus any movement of the 2D imager or 2D bar code is less detrimental to image capture.

The aperture 218 is a mechanical device with an opening through which light passes. The aperture 218 may have an adjustable barrier it adjusts to form different size openings. The adjustable barrier may be manipulated by a controller. The aperture 218 is communicatively coupled to a processor, which can specify a particular aperture setting. Aperture is a measure of how large an opening light passes through into an optical system. Aperture is traditionally measured in terms of standardized "aperture stops," ranging typically from f/2 up to f/16 and beyond. The smaller a numeral in a given aperture stop, the larger the aperture, and thus more light will enter the optical system for a given period of time. For example, an optical system with an aperture stop of f/7 will allow more light in during a given period of time than an optical system with an aperture stop of f/9. The aperture stop and shutter speed work together to regulate the amount of light that enters the imaging system.

As aperture increases, DOF decreases. DOF refers to the distance within an image being captured that appears in focus. For example, assume an optical system is capturing an image of three objects located at three different distances from the optical system. For an optical system having a shallow DOF, one object within the captured image may appear in focus, but the other two objects located behind or in front of the in-focus object will appear blurry. For an optical system having a deep DOF, all three objects within the captured image will appear in focus. Designing an appropriate optical system for a 2D imager requires consideration of the tradeoff between aperture and DOF. A large aperture will allow more light into the system in a short period of time, providing for a quick shutter speed. But increasing aperture reduces DOF, requiring an operator to get very near a 2D bar code to capture a crisp image for decoding.

An embodiment of the invention uses a larger aperture than a standard 2D imager (allowing for a quick shutter speed) while maintaining the same DOF as a standard imager. In one embodiment, this is accomplished by using a light source composed predominantly of two distinct frequency ranges and a lens with chromatic aberration. The color of visible light perceived by the human eye is a function of the frequency of waves composing the light. Waves with the highest frequencies (and thus shortest wavelengths) in the visible spectrum appear violet. And waves with the lowest frequencies (and thus longest wavelengths) in the visible spectrum appear red. 2D imagers use a wide range of light sources, including light-emitting diodes (LEDs), incandescent bulbs, lasers, external light sources, and other light sources well known in the art. Each light source's color is representative of the predominant frequencies emitted by the source.

Figure 3:
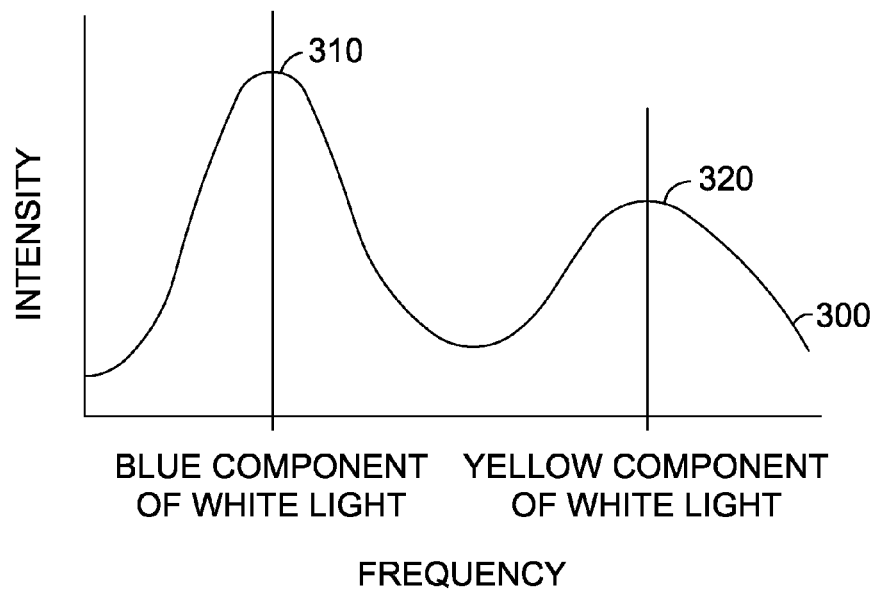
FIG. 3 is a schematic representing the intensity versus frequency across the visible spectrum of light emitted from a white LED, illustrating high intensities at the frequencies associated with the blue and yellow components of white light.

One embodiment of the invention uses a white LED as a light source. A white LED emits light across the spectrum of visible light with especially high intensity distributions in the blue and yellow frequency ranges. FIG. 3 presents a representative graph depicting light intensity versus frequency across the frequency range of a typical white LED 300. The frequencies composing blue visible light (the blue component) 310 and the frequencies composing yellow visible light (the yellow component) 320 of the frequency range of a typical white LED 300 are much more intense than other frequencies across the visible spectrum of light. Returning again to FIG. 2, if a typical white LED as depicted in FIG. 3 is used as the light source 210, the two frequency ranges that would predominantly form an image on the image sensor 230 would be the blue component 310 and the yellow component 320 of the frequency range of typical white LED 300.

Chromatic aberration is a lens distortion that arises due to dispersion (i.e., a variation of the refractive index of the lens material as a function of wavelength). Refraction is the change of direction of a wave resulting from the change in velocity when the wave passes from one medium to another. In an optical system, when a light wave enters a lens, the different density of the lens from the surrounding air causes the wave to slow and bend, or refract. Some lenses are vulnerable to a variation of refractive indexes as a function of wavelength, creating a dispersion of the wavelengths leaving the lens. This dispersion is known as chromatic aberration. If light is composed of two predominant frequencies and enters a lens vulnerable to chromatic aberration, the two frequencies will leave the lens at different angles and ultimately focus in different focal planes, resulting in blurry images.

Figure 4:
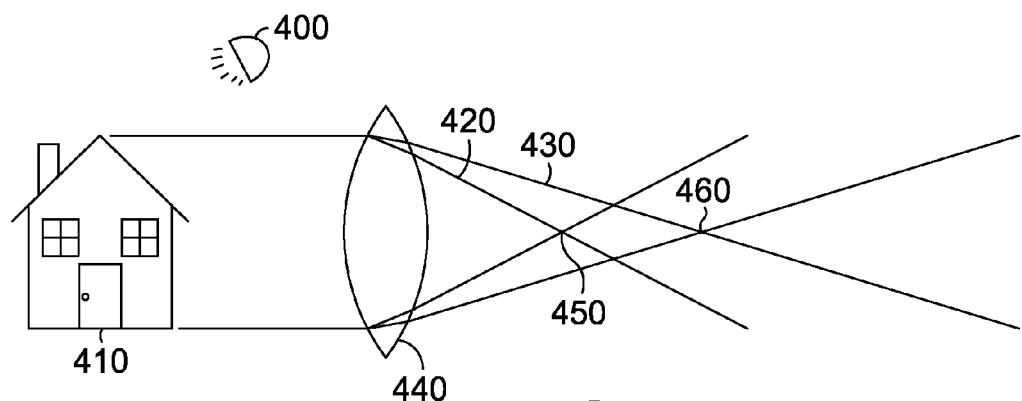
FIG. 4 is schematic representing two different focal planes for a light source having two predominant wavelengths through a lens with inherent chromatic aberration.

FIG. 4 illustrates a lens with chromatic aberration, forming two different focal planes for two different frequencies of light. In FIG. 4, a light source 400 is reflected off an object 410. The light source 400 is composed of two predominant frequencies, illustrated by rays 420 and 430, representing a smaller-wavelength component and a larger-wavelength component, respectively. The reflected light refracts through a lens 440, but due to chromatic aberration, the two predominant frequencies refract at different angles from one another. Focal points 450 and 460 represent the points where rays 420 and 430 come to a perfect focus, respectively. Due to the chromatic aberration in lens 440, the rays 420 and 430 come to a perfect focus at different focal distances from the lens 440. The shorter-wavelength ray 420 refracts more, coming to a perfect focus closer to the lens 440 at focal point 450. The longer-wavelength ray 430 refracts less, coming to a perfect focus further from the lens 440 at focal point 460. This results in blurry images: If an image sensor is placed at point 450, the shorter-wavelength ray 420 is in perfect focus, but the longer-wavelength ray 430 would be out of focus, causing a blur. And if the image sensor is placed at point 460, the longer-wavelength ray 430 is in perfect focus, but the shorter-wavelength ray 420 is out of focus, also causing a blur.

2D imagers in the prior art use an optical system that corrects for such chromatic aberration. For example, in the case of a standard 2D imager using a white LED portrayed in FIG. 3, the optical system would correct for chromatic aberration to ensure the blue component 310 and the yellow component 320 of the white LED ultimately focus on the same plane. Without such correction, an image of a 2D bar code formed on the image sensor would be blurry, making decoding of the image difficult.

Figure 5:
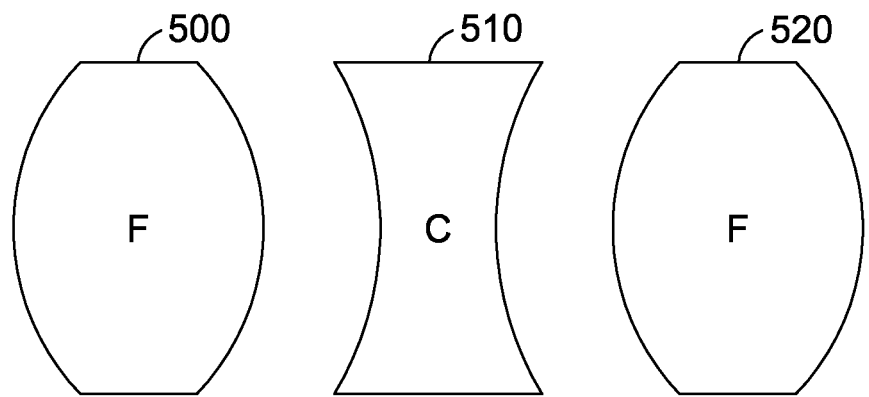
FIG. 5 depicts a lens configuration with increased chromatic aberration according to an embodiment of the invention.

Embodiments of the invention do not correct for chromatic aberration, but rather uses such chromatic aberration to improve motion tolerance. In one embodiment, the chromatic aberration inherent is intentionally increased. FIG. 5 illustrates a lens configuration according to one embodiment of the invention that increases chromatic aberration. In FIG. 5, lenses 500 and 520 are convex lenses made of flint glass (denoted "F" in FIG. 5), and lens 510 is a concave lens made of crown glass (denoted as "C" in FIG. 5). Crown glass has a low refractive index and low dispersion while flint glass has a high refractive index and high dispersion. The lens configuration in FIG. 5 is reversed from the arrangement of lens in an optical system aiming to reduce chromatic aberration. A configuration of crown, flint, crown normally corrects for chromatic aberration. But the reverse arrangement of flint, crown, flint, as depicted in FIG. 5, increases the chromatic aberration of the optical system. Returning to FIG. 2, if the lens module 220 is comprised of a flint lens 500, crown lens 510, and flint lens 520 as depicted in FIG. 5, an image of a bar code 120 would always appear blurry on the image sensor 230 to the naked eye due to chromatic aberration.

However, only one frequency of light is needed to read a 2D bar code. Because a bar code merely encodes information by distinguishing between areas of low reflectivity (bars) and areas of high reflectivity (spaces) without relying on the multiple colors of a source image, a monochromatic image sensor can be used as the image sensor 230 in FIG. 2. The monochromatic image sensor will receive in-focus light (one of the two predominant frequencies) and out-of-focus light (the other of the two predominant frequencies). Normally, such a combination would result in a blurry, undecodable image. However, when the optical system increases the chromatic aberration, by, for example, using the lens structure of FIG. 5, the second predominant frequency produces a consistent noise rather than a disruptive, slightly out-of-focus image. With knowledge of this predictable noise, a processor may quickly decode the image, resulting in a motion tolerant 2D imager.

Specifically, in one embodiment of the invention, an improved 2D imager uses a white LED, an optical system with high chromatic aberration, and a monochromatic sensor. As presented in FIG. 3, the blue component 310 and yellow component 320 have the highest intensities across the frequency range of a white LED 300. In this embodiment, if the blue component 310 is focused on an image sensor, the yellow component 320 will be out of focus due to chromatic aberration of the optical system. However, because the chromatic aberration is intentionally increased, the yellow component 320 is a consistent noise, and a processor can effectively decode the image formed by the blue component 310 on the image sensor. And if the yellow component 320 is focused on an image sensor, the blue component 310 will be out of focus due to chromatic aberration, however the blue component 310 is a consistent noise, and the processor can effectively decode the image formed by the yellow component 320.

Figure 6:
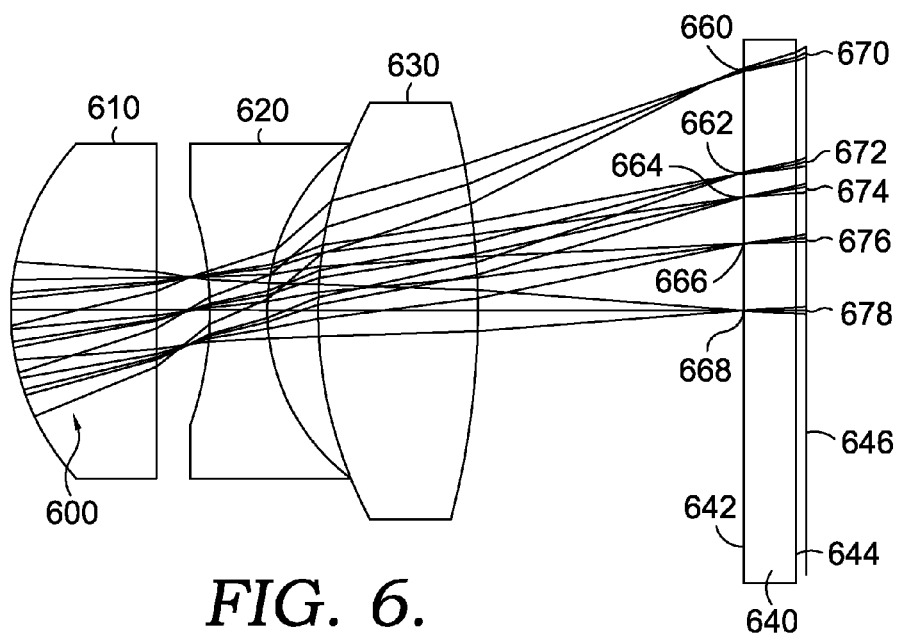
FIG. 6 shows a ray-tracing diagram for a blue component of a white LED through a lens configuration with high chromatic aberration according to an embodiment of the invention.
Figure 7:
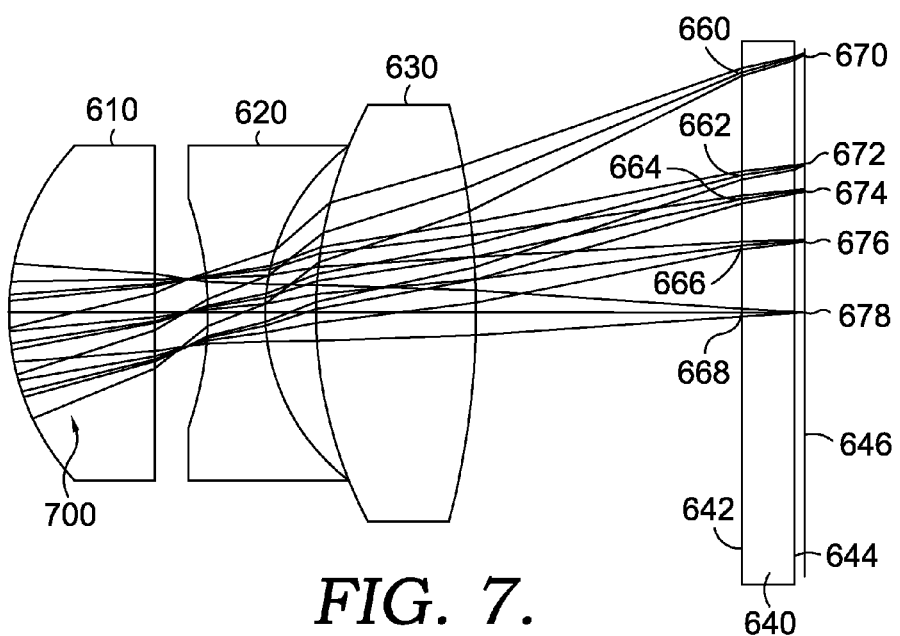
FIG. 7 shows a ray-tracing diagram for a yellow component of a white LED through a lens configuration with high chromatic aberration according to an embodiment of the invention.

FIG. 6 presents a ray diagram tracing rays of the blue component of a white LED 600 through an optical system according to one embodiment of the invention, and FIG. 7 presents a ray diagram tracing rays of the yellow component 700 of a white LED through the identical optical system. The optical system in FIG. 6 and FIG. 7 is composed of a first flint lens 610, a crown lens 620, a second flint lens 630, and a monochromatic image sensor 640. The monochromatic image sensor 640 contains a front surface 642 and a rear surface 644. As illustrated in FIG. 6, the rays of the blue component 600 are refracted through the three lenses 610, 620, and 630, and come to a perfect focus on the front surface of the image sensor at points 660, 662, 664, 666, and 668. But, as illustrated in FIG. 7, the rays of the yellow component 700 are out of focus at each of these points due to chromatic aberration. Although the rays enter the optical system at the same point in both FIG. 6 and FIG. 7, the rays of the yellow component 700 do not come to a perfect focus until they reach line 646, located behind the rear surface 644 of the image sensor 640, at points 670, 672, 674, 676, and 678. But due to the increased chromatic aberration of the optical system, the yellow component 700 is a consistent noise at points 660, 662, 664, 666, and 668, and thus a 2D imager using this optical system can effectively decode the image focused by the blue component 600 on the front surface 642 of the image sensor 640 without undue interference from the yellow component 700.

If instead the front surface 642 of image sensor 640 were located at line 646, then the rays of the yellow component 700 would come to a perfect focus on the front surface 642 at points 670, 672, 674, 676, and 678. And the rays of blue component 600 would be out of focus at each of these points. Again, this out-of-focus component is a consistent noise, and the processor is able to easily decode the image formed by the rays of the yellow component 700.

Using an optical system with increased chromatic aberration presents several benefits. First, by using an optical system with increased chromatic aberration, an increased DOF is realized. For example, current standard 2D imagers may use a small aperture, typically an aperture stop of f/9, which produces a depth of field of about 50 cm. However, using an optical system with increased chromatic aberration in the same imager would increase the DOF by about 30% while still using a small aperture, for example an aperture stop of f/9.

To improve motion tolerance, however, an improved 2D imager may "give up" the increased DOF and trade it in for a larger aperture, allowing the optical system to use a quick shutter speed thus improving motion tolerance. As presented above, there is a tradeoff between aperture and DOF: a larger aperture reduces DOF. In the previous example, an imager using the improved optical system could "trade in" its 30% increase in DOF for a larger aperture. If the improved optical system sought to retain a DOF of 50 cm, the system could increase the aperture of the lens configuration, for example, to an aperture stop of f/7. This larger aperture allows more light through the lens, allowing the optical system to reduce the amount of time a shutter must remain open to capture the image of the bar code. Returning to our previous example, an improved imager using an aperture of f/7 and having a DOF of about 50 cm could capture an image of the bar code using a shutter speed of about 2 ms.

The result is dramatic, resulting in quick and accurate readings of 2D bar codes. With such a quick shutter speed, a 2D imager is tolerant to movement by either the 2D imager or the 2D bar code during image capture. And by using such an optical system there is no increase in power consumption by the 2D imager. A 2D imager equipped with the above disclosed optical system thus produces quick and reliable decoding of 2D bar codes affordably and efficiently.

Many different arrangements of the various components depicted, as well as components not shown, are possible without departing from the spirit and scope of embodiments of the invention. Embodiments of the invention have been described with the intent to be illustrative rather than restrictive. Certain features and subcombinations are of utility and may be employed without reference to other features and subcombinations and are contemplated to be within the scope of the claims.

Many different arrangements of the various components depicted, as well as components not shown, are possible without departing from the spirit and scope of embodiments of the invention. Embodiments of the invention have been described with the intent to be illustrative rather than restrictive. Certain features and subcombinations are of utility and may be employed without reference to other features and subcombinations and are contemplated to be within the scope of the claims.

The invention claimed is:

1. An apparatus for decoding barcodes, the apparatus comprising:
   an imager housing comprising a body and a viewing window formed in an exterior portion of the body, the viewing window configured to allow light to travel between an interior and an exterior of the imager housing;
   a light source, coupled to the imager housing, that emits light comprising a plurality of frequency components, wherein a first frequency of the light is a blue component of the light and a second frequency of the light is a yellow component of the light;
   an optical system that is located inside the imager housing, comprising:
   (1) a shutter that is operable to transition between a closed position and an open position, and wherein light is prevented from entering the optical system when the shutter is in the closed position;
   (2) an aperture, wherein the aperture comprises an opening through which light passes when the shutter is in the open position;
   (3) a lens module that generates a chromatic aberration as light passes through a lens configuration; and
   (4) an image sensor configured to capture image data, wherein the image data includes at least a first image formed by the first frequency of the light and a second image formed by the second frequency of the light; and
   a processor, attached to the imager housing and communicatively coupled to the image sensor, the processor configured to decode the first image formed on the image sensor and interpret the second image as noise,
   wherein the optical system and the viewing window are arranged such that, when the shutter opens, light is able to travel from the exterior of the imager housing to the interior of the imager housing by passing through the viewing window, through the aperture, through the lens module where it is refracted and dispersed due to the chromatic aberration, and onto the image sensor where it forms an image.

2. The apparatus for decoding bar codes of claim 1, wherein the light source is located within the imager housing, and wherein the light source and the viewing window are arranged to allow light emitted from the light source to pass from the interior to the exterior of the imager housing.

3. The apparatus for decoding bar codes of claim 1, wherein the lens module comprises a first convex lens made of flint glass and a second convex lens made of crown glass.

4. The apparatus for decoding bar codes of claim 1, wherein the lens module is configured to form a first image by a first frequency component of the plurality of frequency components that is in focus on the image sensor and form a second image by a second frequency component of the plurality of frequency components that is out of focus on the image sensor.

5. The apparatus for decoding bar codes of claim 1, wherein the shutter, when instructed to open by a user interface, opens and then closes after approximately 2 ms.

6. The apparatus for decoding bar codes of claim 1, wherein the aperture is approximately an f/7 aperture stop opening.

7. The apparatus for decoding bar codes of claim 1, wherein the image sensor is a monochromatic image sensor.

* * * * *